Jan. 1, 1929.
W. A. GIESKIENG
JOURNAL BEARING LUBRICATOR
Filed Aug. 9, 1927
1,697,113
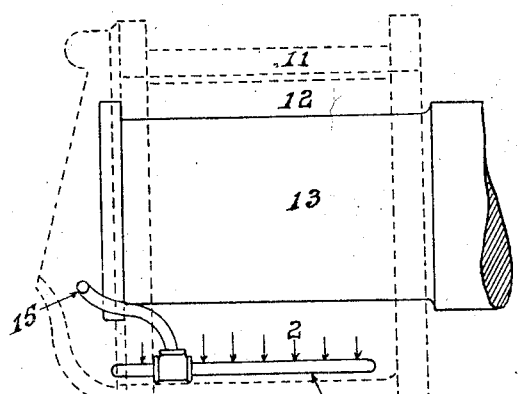
Fig. 1.
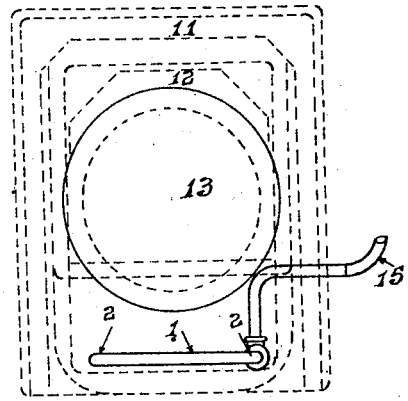
Fig. 2.
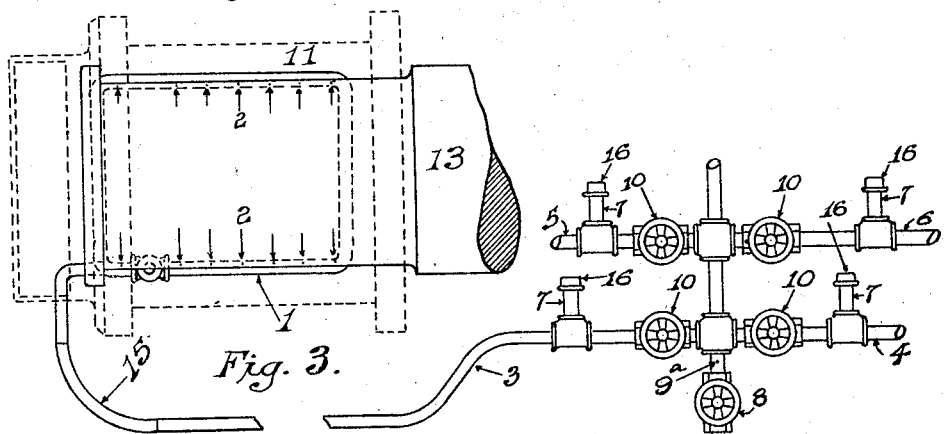
Fig. 3.
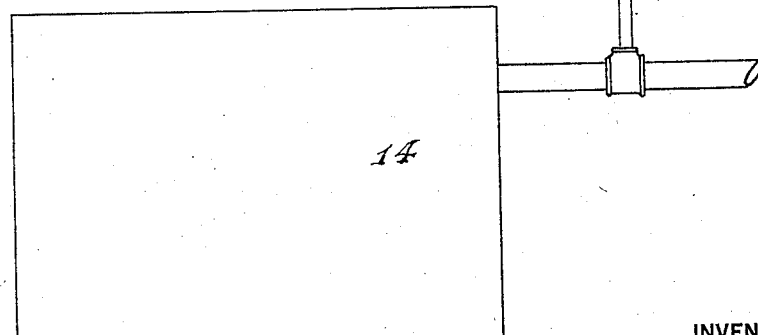
INVENTOR
W. A. Gieskieng
Watson E. Coleman
ATTORNEY Patented Jan. 1, 1929.

1,697,113

UNITED STATES PATENT OFFICE.

WILLIAM A. GIESKIENG, OF SALIDA, COLORADO.

JOURNAL-BEARING LUBRICATOR.

Application filed August 9, 1927. Serial No. 211,804.

This invention relates to means for lubricating and protecting bearings such as are used on locomotives, railway cars and in like situations and which are packed with wool, cotton waste or like material, and the general object of the invention is to provide means whereby the cotton or wool packing in the bottom of the cellar will be forced upward from time to time as the engineer or other operator desires so as to loosen this packing and prevent it from glazing and thus preventing the oil from reaching the surface of the journal.

A further object is to provide means of this character which may be under the control of the operator in the cab of the engine or, when applied to cars or coaches, under the control of the inspector.

A still further object is to provide means whereby the packing may be stirred up and the oil raised up to the journal while the engine is running at any speed without the engineer moving from his seat.

My invention is illustrated in the accompanying drawing, wherein:—

Figure 1 is a diagrammatic elevation in dotted lines of a journal box, the journal being shown in full lines and illustrating my invention as applied thereto;

Figure 2 is a front elevation of the journal and my invention, the box being shown in dotted lines;

Figure 3 is a top plan view of the journal and my invention applied thereto, the box being shown in dotted lines, this view also showing diagrammatically the means whereby oil and air may be forced into the journal box whenever desired.

Referring to this drawing, it will be seen that my invention includes a pipe 1 seated in the bottom of the oil box of the journal bearing and beneath the packing therein. This pipe is perforated with a plurality of $\frac{1}{16}$" holes 2. The pipe is preferably formed to define a rectangle so that there is a branch extending down both sides of the box and across the inner ends thereof, and these side portions of this pipe 1 are provided with perforations 2. Each pipe at its inlet end is provided with a T from which a pipe 3 extends, this pipe 3 having a portion thereof formed of flexible pipe 15, as shown in Figure 3. The pipe 3 extends to and communicates with a pipe 9, which in turn connects, as shown in Figure 3, with the main reservoir 14 of the air brake system, this main reservoir having air under pressure. A valve 8 is provided in the pipe 9 so as to control the passage of air from the main reservoir into the pipe 3. The pipe 3 is provided with an individual valve 10 and between this valve and the journal bearing there is formed the oil chamber 7 having a detachable cap 16. This oil chamber 7 communicates with the interior of the pipe 3.

I have illustrated in Figure 3 a pipe 4 which is the same pipe as pipe 3 but extends to the right trailer truck, the pipe 3 extending to the left trailer truck. A pipe 5 leads to the left leading truck and the pipe 6 to the right leading truck. Each of these pipes is connected to the perforated pipe 1 disposed within the cellar of the bearing box and each of these pipes 3, 4, 5 and 6 is provided with an individual valve 10 whereby any one of these pipes may be cut out or communication cut off between the pipe 9 and this individual pipe. By removing the cap 16, oil can be inserted within the chamber 7 and the oil blown into the box through the pipes 3, 4, 5 and 6. This can be done while the locomotive is running and without the engineer or other operator who controls valve 8 moving from his seat or withdrawing his eyes from the track.

It will be understood, of course, that the valve 8 is diagrammatically shown, as this valve 8 will be located in the engine cab and in cars or coaches may be located at any desired and convenient position. The pipe 9 is provided with a pinhole $9^a$ which constitute a telltale and will leak while in use, or in other words will allow the air to leak or blow. Thus the engineer will know whether the valve 8 is shut off or not and will thus not forget and permit the air to leak out the pipe 9. The flexible hose 15 is to permit the movement of the locomotive on curves. The oil box 11 has been illustrated diagrammatically in doted lines. 12 designates the brasses of the box and 13 the journal or axle extending into the box.

The operation of this device is as follows: By ejecting a jet of air under the packing in the cellar, the packing will be lifted against the journal at the will of the operator and this action will raise the oil that tends to settle in the bottom of the oil box or cellar up to the journal where it will lubricate the journal and mix with the packing. Thus the packing will be stirred up so that it will be springy and alive and all scale and sediment that tends to gather at the top of the packing will be dislodged. The packing will thus be prevented from glazing at the point of contact with the journal. This glaze prevents the oil from reaching the surface of the journal. The upwardly projected air currents projected from the apertures in the pipes will so stir up the packing as to increase its capillarity so as to allow free wicking or siphoning of the oil from the bottom of the cellar to the journal, resulting in 100% lubrication.

A working embodiment of my invention was recently applied to a large mountain passenger engine on the Denver & Rio Grande Western Road. It was given thirty-five days of actual test, the engine having made 3650 miles. At no time in the thirty-five days was there any expense attached, no repacking had to be made or any attention rendered by shop forces, no free oil was required to be applied, and during this thirty-five days no report was made by any of the engineers other than that the boxes were in perfect condition. Since the removal of my invention from the bottom of the cellars almost every trip the boxes have to be repacked and oiled. I make this statement in order that it may be seen that the invention is a thoroughly practical one and that it has been tested and performed its work properly.

While I have illustrated a form of my invention which I have found to be entirely effective and thoroughly satisfactory, I do not wish to be limited to this as obviously many minor changes might be made without departing from the spirit of the invention as defined in the appended claims.

I claim:—

1. In a journal bearing having journal packing, means disposed below the packing for blowing air upward to thereby raise the packing against the journal and open up the packing.

2. The combination with a journal bearing having journal packing, of means for raising the packing against the journal including a pipe disposed in the lower portion of the bearing below the packing, the pipe being perforated at intervals, and means for discharging air through said perforated pipe upward against the packing to thereby raise the packing against the journal and open up the packing.

3. The combination with a journal bearing having journal packing therein, of means for forcing oil upward into the packing including a pipe disposed below the packing, a source of oil opening into the pipe, and means for forcing air through the pipe into the journal box whereby to raise the packing against the journal and open it up, that portion of the pipe disposed within the journal box being perforated.

4. The combination with a journal box having journal packing, of means for forcing oil and air into the journal box comprising a pipe having a portion thereof disposed within the journal box below the packing thereof, the pipe being perforated therein, a source of air under pressure, manually controllable means for admitting the air under pressure to said pipe, and a lubricant-containing chamber communicating with the pipe.

5. The combination with a journal box having journal packing therein, of a pipe extending around the bottom of the journal box below the packing, this portion of the pipe being perforated, said pipe extending out of the journal box, a pipe connecting the first named pipe to a source of air under pressure and having a manually actuatable valve therein.

In testimony whereof I hereunto affix my signature.

WILLIAM A. GIESKIENG.